United States Patent [19]
Barnett et al.

[11] 3,853,000
[45] Dec. 10, 1974

[54] STRAIN MEASURING TRANSDUCER

[75] Inventors: John David Barnett; George Brian Barlow, both of Stockport, England

[73] Assignee: Peak Components Limited, Chesire, England

[22] Filed: Feb. 18, 1972

[21] Appl. No.: 227,529

[30] Foreign Application Priority Data
Feb. 23, 1971  Great Britain...................... 5172/71

[52] U.S. Cl.............. 73/88.5 R, 33/DIG. 13, 338/6
[51] Int. Cl............................................. G01b 7/18
[58] Field of Search.......... 73/88.5 R, 141 A; 338/5, 338/6; 33/147 D, 148 D, DIG. 13

[56] References Cited
UNITED STATES PATENTS
| | | | |
|---|---|---|---|
| 2,316,975 | 4/1943 | Ruge | 73/88.5 R X |
| 2,416,664 | 2/1947 | Ruge | 73/88.5 R X |
| 2,513,295 | 7/1950 | Eisenberg | 73/88.5 R X |
| 3,033,034 | 5/1962 | Ziggel | 73/141 A |
| 3,082,621 | 3/1963 | Soderholm | 73/88 R |
| 3,486,369 | 12/1969 | Korzilius | 73/67.2 |
| 3,554,025 | 1/1971 | Andersson et al. | 73/141 A |
| 3,621,437 | 11/1971 | Mading | 73/88.5 R X |

FOREIGN PATENTS OR APPLICATIONS
| | | | |
|---|---|---|---|
| 841,234 | 6/1952 | Germany | 73/88.5 R |

*Primary Examiner*—Charles A. Ruehl
*Attorney, Agent, or Firm*—Sughrue, Rothwell, Mion, Zinn & Macpeak

[57] ABSTRACT

A strain measuring transducer adapted to be fitted to a structure liable to strain, comprising two thick end parts, a thin strip joining the ends, a resistance strain gauge mounted on the strip, and spikes on the end parts to dig into the structure. The transducer is mounted in a corrosion and dust proof casing.

4 Claims, 4 Drawing Figures

STRAIN MEASURING TRANSDUCER

This invention relates to the measurement of strain in relatively rigid structures.

Strain is usually measured in such structures by applying to the surface thereof one or more strain gauges in the form of short lengths of electrically conductive wire which may be wound on an extensible backing sheet. When the structure increases or decreases in length or flexes, the wire moves with the structure and its electrical resistance changes. This change in resistance is usually measured in a bridge type circuit and used to give an indication of the strain in the structure.

The use of strain gauges is often limited to situations where the expense of installation can be justified because the surface of a structure to which a known form of strain gauge is to be fixed has to be very carefully cleaned and prepared, for example by sand blasting, and the strain gauge must be adhered very accurately and carefully to the prepared surface. This is disadvantageous in that skilled personnel are required for the installation, which naturally increases the cost thereof. Such strain gauges also have the disadvantage that they can often become detached from a structure due to wear and tear, and are unsuitable for use in some shop floor conditions, for example, in a press shop. If used in such conditions, contamination by oil or swarf or physical disturbance due to wear and tear often renders them useless after a short period of time.

It is an object of the present invention to provide a strain measuring transducer by which the above disadvantages can be obviated or minimized.

According to the present invention there is provided a strain measuring transducer comprising at least one resistance strain gauge, a base on which the gauge is mounted, a pair of spaced apart fixing portions between which said base extends, means on each fixing portion whereby it can be fastened securely to the surface of a structure the strain of which is to be measured, and a casing enclosing the operative parts of the transducer, the remainder of the casing not occupied by the said parts being filled with a moisture-repelling resilient material.

Preferably the base is in the form of a bridge or strip between the fixing portions and has an intermediate neck of substantially reduced cross-section compared with the cross-section of the base. The reduction is preferably made in the width of the base.

From the phrase "substantially reduced cross-section compared with the cross-section of the base" it follows that if the transducer is compressed or extended longitudinally, substantially all change in length thereof becomes effective at the neck by reason of it being weaker than the remainder of the base. The confinement of substantially all such changes of length to the neck is an important feature of the invention in applications where low strain have to be measured. When larger strains have to be measured, the base can be of uniform cross-section. The term "transducer" has been used because, in use, strain in a sturcture produces strain in the transducer which can be measured from the strain gauges fixed to the transducer rather than directly to the structure.

Preferably each fixing portion is in the form of a block of material and the base is secured firmly thereto in the form of a bridge of uniform thickness equal in overall width to the width of the blocks; the neck is of the same thickness as the base and arranged centrally thereof and co-axially therewith, in the direction of application of strain to the transducer.

Preferably the said fixing means includes an aperture disposed centrally of each block and extending therethrough at right angles to the plane of the base through which a securing stud or bolt passes.

The fixing means may also comprise a plurality of hardened steel sharp pointed pins extending from each fixing portion towards the structure to which the transducer is to be affixed.

Preferably one strain gauge is attached to the top surface and one to the bottom surface of the neck of the transducer. Leads from the or each gauge are attached to a terminal block carried by a casing for the transducer. This assembly may be provided with a cover, and the whole of the interior of the casing and cover are filled with a suitable resilient water-repellent insulative filling.

The invention also includes strain measuring apparatus comprising a transducer with a strain gauge or gauges, as above described, attached to a structure, the or each strain gauge being connected to an electric circuit whereby variations in the resistance of the gauge or gauges can be used to give an indication of the strain in the transducer and therefore in the structure. Preferably the transducer is of the same material as the material of the structure so that thermal expansion does not cause spurious signals to arise. Alternatively the material of the transducer can be chosen to have the same, or substantially the same, co-efficient of thermal expansion as the material of the structure.

The invention is, of course, applicable to the measurement of steady, cyclic, or varying strain, provided the strain limit of the transducer is not exceeded.

Reference is now made to the accompanying drawings in which.

Figure 1:
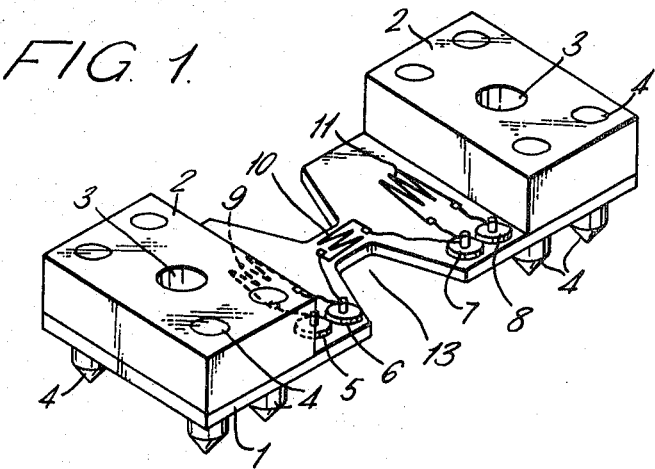
FIG. 1 is a view of the operative part of a transducer.

From FIG. 1 it will be seen that the transducer consists of a base in the form of a strip 1 with two end blocks 2, the strip being joined firmly to both blocks as for example by welding. Alternatively, the strip and blocks may be formed or machined from a single block of metal. Each block 2 is provided with a transverse hole 3 and with four sharp pointed steel pins 4, these pins being fixed firmly in the blocks. It is essential that all parts of this portion of the transducer shall be firmly joined to the adjacent parts thereof; there must be no shake or looseness in any of the joints.

The transducer is provided with four terminals 5, 6, 7 and 8, and with four resistance elements 9, 10, 11 and 12, element number 12 corresponding to element 10 being fastened to the underside of the strip and therefore not shown. It is connected between terminals 5 and 8.

Resistors 9 and 11 act as the fixed arms of a Wheatstone bridge network, and resistors 10 and 12 act as the variable arms thereof. Both these resistors 10 and 12 are resistance strain gauges, and they consist of a wire grid applied to a resilient support, the whole assembly in each case being secured firmly to the strip 1 by adhesive.

As shown, the strip 1 is reduced in width at 13 to form a neck along which the strain gauges 10 and 12 are applied. This has what may be considered as an amplifying effect, since the effective strain distance between the blocks 2 is considerably greater than the length of the neck 13. It therefore follows that any strain movement of the transducer is conveyed almost in its entirely to the neck 13, which since it is much shorter than the effective distance between the blocks, producing a multiplying effect.

Since the strain gauge itself, if applied for example to automobiles or weighing machines, would almost certainly be affixed to steel members, the strip 1 and the blocks 2 would then preferably be made of steel so as to provide substantially the same degree of thermal expansion as that of the base structure. By this means thermal expansion or contraction of the structure can be prevented from giving a false strain reading, since the assembly shown in FIG. 1 may be compensated for temperature variation therein by part of the associated circuit.

Figure 2:
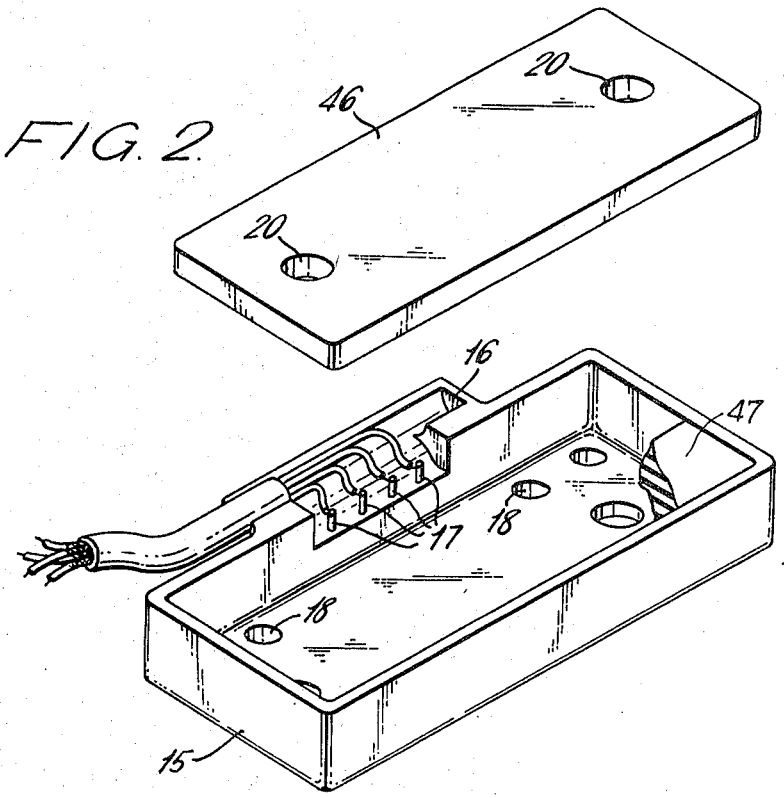
FIG. 2 shows the transducer casing.

The assembly shown in FIG. 1 is provided with a case 15 (FIG. 2) comprising a cable inlet 16 and terminals 17. These terminals 17 are connected to the terminals 5 to 8 shown in FIG. 1, and the assembly of FIG. 1 is inserted in the base 15 with the pins 4 projecting through holes 18 formed in the base. After this assembly procedure and wiring up of the resistors, the cover 46 is applied, and secured in position by an adhesive or by welding. Preferably the case and the cover are made of a hard plastic material which, whilst being sufficiently elastic, is not readily distorted to any appreciated degree by normal external forces.

When the assembly of FIG. 1 has been placed in its case and the lid is affixed thereto, the whole of the remaining interior of the box so formed is pressure injected with a flowable material 47 which is non-corrosive, insulating, water repellant, self setting, and of low modulus compared with the strip 1. Certain varieties of silicon rubber fulfill these conditions. The injection process is continued until all the openings into the case e.g., the holes round the pins, FIG. 4, and the cable inlet 16, are completely sealed except for the holes 20 and 3. The resultant transducer can thus be fitted in places subject to dirt, moisture or fumes, without fear of the reading thereof being affected in any way.

The assembled transducer with case is fixed into position on a structure by bolts which pass through the holes 3 in the transducer and through holes 20 in the case. Preferably the bolts are stud bolts which are welded in position on the structure the strain of which is to be measured, and pressure is applied direct to the top surface of each block 2 by nuts on the stud bolts and hence to the pins 4, which produce minute conical holes in the structure itself, thus locating each block firmly in position.

As stated above, the strain gauges 10, 12 and resistors 9, 11 which themselves may be inactive strain gauges, form a Wheatstone bridge network, the strain gauges 10, 12 being located in the bridge so that when their resistances vary, the maximum amount of unbalance to the bridge is caused. The bridge is connected to an amplifying circuit of known form in which zero setting and temperature variation compensation are provided. The output current of the amplifier passes through a current meter of suitable type, which is usually calibrated to represent the load on the structure. Thus if the transducer is applied to the axle of a motor vehicle, the indicating instrument can be provided in the driver's cab and can be calibrated in units of load per axle or even per wheel, provided that the transducer or transducers are suitably connected. For example, in a four-wheel vehicle, a transducer may be provided near each wheel, and the amplifier circuit may be so switched as to show an indication of the load on each wheel individually, or the summated total of all the said loads.

Although FIG. 1 shows the strain gauge as having a strip with a reduced neck in order to obtain amplification during strain measurement, it should be understood that if the structure on which the transducer is to be applied provides ample strain itself, then the neck portion 13 need not be produced in the strip 1 so that the amount of strain in the strain gauges 10, 12 becomes less than the total amount of strain between the effective centres of the pins on the two blocks.

Figure 3:
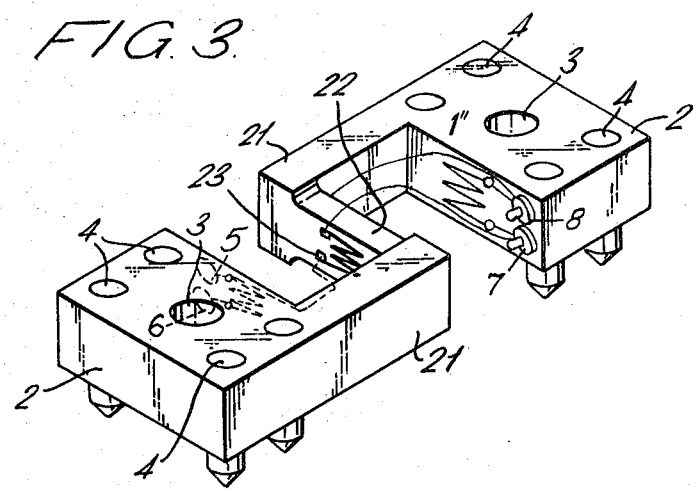
FIG. 3 is an alternative form of transducer, for use where high strains are encountered.

Should the structure the strain of which is to be measured be subject to very high degrees of strain, then an assembly of blocks and strip as shown in FIG. 3 may be used. Items of apparatus common to FIGS. 1 and 3 are similarly numbered.

As can be seen from the drawings, each block is provided with an extension 21, the ends of the extensions being substantially level in a direction normal to the length of the assembly. Between these ends extends a neck 22, with a strain gauge 23 on one side of the neck. A corresponding strain gauge is fitted on the other side of the neck. Fixed resistors may also be provided on the blocks similar to those shown at 9 and 11 in FIG. 1, their location on the block being for temperature compensation purposes.

As can be seen, strain between the two blocks causes a kind of bending stress in the neck 22, and since any strain applied between the two blocks is very much smaller than the length of the neck 22, the deflection of the neck under such strain is substantially linear. It therefore follows that the gauge 23 also varies linearly in length but its strain is reduced as compared with the structure strain owing to the geometry of the arrangement. The assembly shown in FIG. 3 therefore acts as a dividing apparatus with reference to the applied strain.

It should here be noted that the strain gauges of both FIGS. 1 and 3 are produced separately from the remainder of the assembly, and are applied to the surface of the base or strip by adhesive. This is a skilled job, but as it has to be done once only, whereafter the whole of the transducer is sealed up, no problems of application of the transducer to a structure follow, since no part of the transducer is caused to adhere to the structure.

Figure 4:
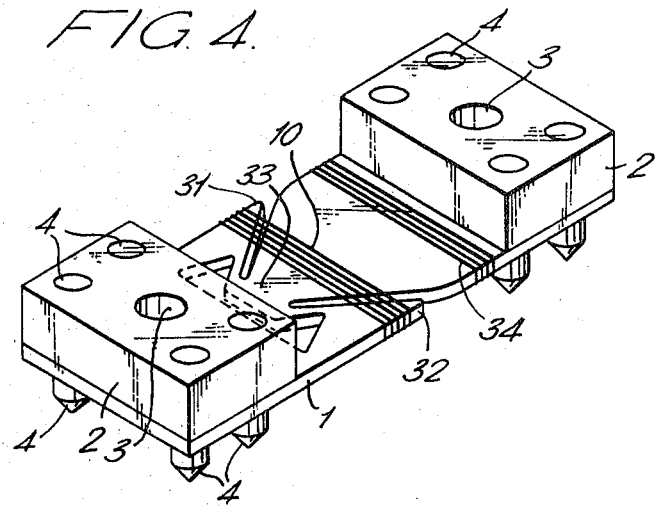
FIG. 4 is a view of an alternative form of transducer for low strains.

FIG. 4 shows a further alternative assembly having a so-called magnifying characteristic which can be substantially greater than that produced by the assembly of FIG. 1. Again, blocks 2 are fixed to a base or strip 1, and have fixing pins 4 and central bolt holes 3. In this embodiment, however, the base is provided with two horns 31, 32, these being connected to a central tongue 33, with a strain gauge winding 10 applied over the horn, the winding being applied under tension. A temperature compensating winding 34 may also be applied to the strip 1 as shown.

If a transducer including the assembly of FIG. 4 is applied to a structure which is subject for example to an increasing strain, then the linkage between the horns 31, 32 and the tongue 33 is such as to cause the horns to move outward at a rate which is considerably higher than that of the rate which the two blocks 2 move apart. This applies a multiplied strain to the winding 10, so that a high rate of change of resistance in this winding takes place for a relatively small strain of the underlying structure. Another advantage of the arrangement shown is that the winding 10 can be applied to the horns after the base is formed, thus avoiding the necessity for a separate strain gauge. The initial tension applied to the wire of winding 10 is such as to cause the wire to contract if the strain applied between the blocks 2 is such as to move the blocks together rather than apart, though the total strain in this direction must be such as not to remove all the tension from the winding 10.

As described above, a transducer or a group of transducers of the type described may be applied to the axles or wheel supports of a vehicle in order to give an indication to the driver thereof of the individual or collective loading of the wheels. Again, the transducer may be applied to a building or any kind of object under test and its associated circuit calibrated directly in units of strain. It should here be pointed out that the transducer itself is particularly useful where only occasional measurement of a strain is required, since it is easily affixed to and detached from fixing means such as stud bolts. If it is not convenient to provide such stud bolts on the structure to be measured, then straps may be provided to fasten the ends of the transducer firmly in place, so that the points 4 do not move relative to the points of application to the structure during a strain measurement.

To ensure complete constancy and accuracy of working of the transducer during its life it may be subject after assembly to one or more temperature and/or strain cycles in order to relieve any strains in the device itself. Again, after the assembly of the transducer and filling of the case, the whole of the outside may be dipped in a waterproof compound in order to effect thorough sealing.

We claim:
1. A strain measuring apparatus comprising:
 1. at least one resistance strain gauge;
 2. a resilient neck on which said gauge is mounted;
 3. a pair of spaced apart rigid blocks integrally connected to said neck, said neck extending between said rigid blocks in a direction transverse to a line joining the mid points of said rigid blocks;
 4. a plurality of pins firmly affixed to each block, whereby said rigid blocks can be fastened securely to the surface of a structure the strain in which is to be measured;
 5. a case enclosing said resistance strain gauge, said neck, and said pair of rigid blocks, said case having holes therein through which said pins extend; and
 6. a moisture-repelling, resilient insulating material filling the remainder of said case not occupied by said resistance strain gauge, said neck, and said pair of rigid blocks,
whereby a strain between said rigid blocks causes a bending stress in said neck, and, since any strain between said rigid blocks is very much smaller than the length of said neck, the deflection of said neck is substantially linear and can be measured with great accuracy and sensitivity by said resistance strain gauge.

2. A strain measuring apparatus as claimed in claim 1 1. wherein said neck is of rectangular cross section and carries a pair of resistance strain gauges located opposite one another so that a strain applied to said rigid blocks acts oppositely on said gauges and 2. further comprising a bridge network to which said gauges are connected.

3. A strain measuring apparatus as claimed in claim 2 wherein all the resistive components of said bridge network are mounted within said case.

4. A strain measuring apparatus as claimed in claim 1 and further comprising a pair of extensions, one end of each extension being integrally formed with an opposite end of said neck, and the other end of each extension being integrally formed with a different one of said pair of rigid blocks.

* * * * *